Feb. 21, 1950
O. H. SCHADE
ELECTROMAGNETIC DEFLECTION CIRCUIT FOR CATHODE-RAY TUBES
2,498,007
Filed June 14, 1947
5 Sheets-Sheet 1
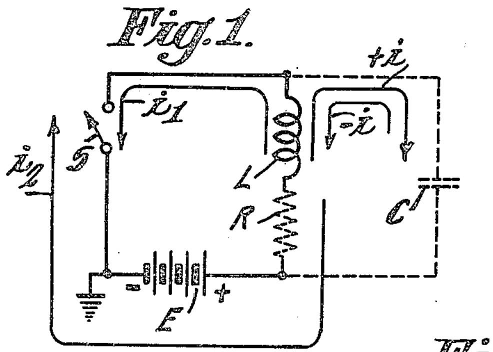
Fig. 2.
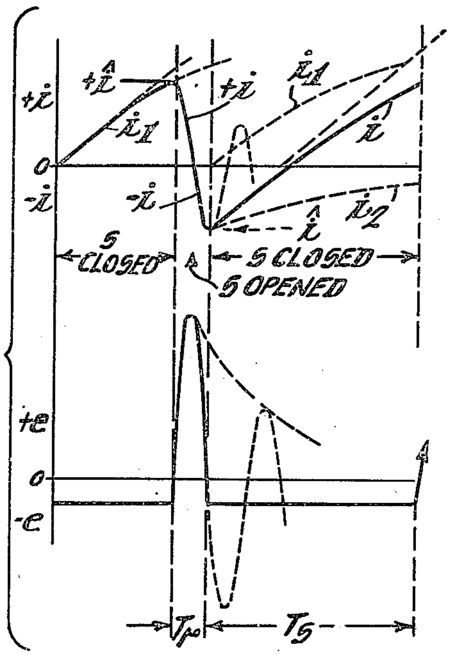
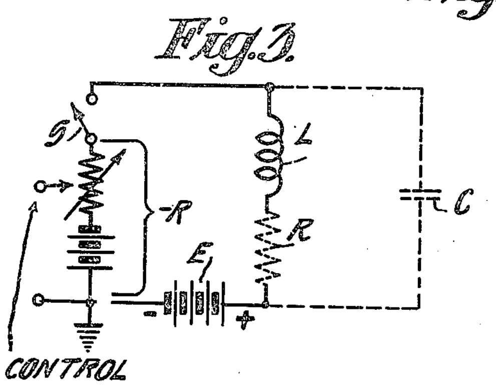
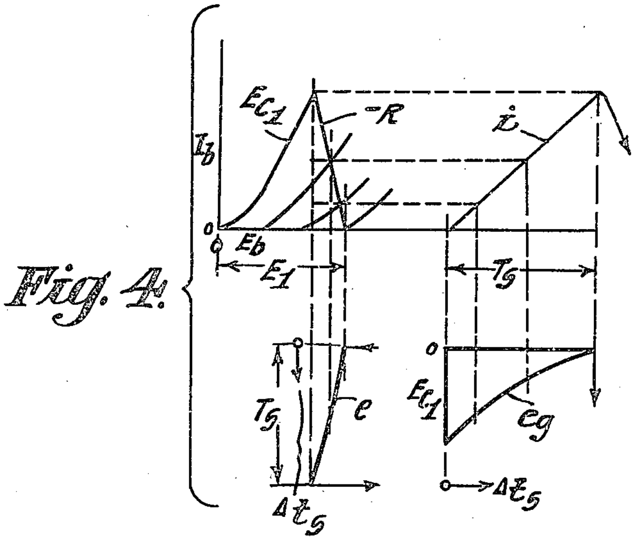
INVENTOR.
Otto H. Schade
BY Samuel B. Smith
ATTORNEY Feb. 21, 1950 O. H. SCHADE 2,498,007

ELECTROMAGNETIC DEFLECTION CIRCUIT FOR CATHODE-RAY TUBES

Filed June 14, 1947 5 Sheets-Sheet 2

INVENTOR.
Otto H. Schade
BY Samuel B. Smith
ATTORNEY

INVENTOR.
Otto H. Schade
BY Samuel B. Smith
ATTORNEY

Feb. 21, 1950 O. H. SCHADE 2,498,007

ELECTROMAGNETIC DEFLECTION CIRCUIT FOR CATHODE-RAY TUBES

Filed June 14, 1947 5 Sheets-Sheet 4

INVENTOR.
Otto H. Schade
BY Samuel B. Smith
ATTORNEY

INVENTOR.
Otto H. Schade
BY Samuel B. Smith
ATTORNEY

Patented Feb. 21, 1950

2,498,007

UNITED STATES PATENT OFFICE 2,498,007

ELECTROMAGNETIC DEFLECTION CIRCUIT FOR CATHODE-RAY TUBES

Otto H. Schade, West Caldwell, N. J., assignor to Radio Corporation of America, a corporation of Delaware Application June 14, 1947, Serial No. 754,760

19 Claims. (Cl. 315—27)

The present invention relates to cathode ray beam deflection circuits, and more particularly relates to cathode ray beam deflection circuits of the type in which an electron scanning beam is required to be deflected in a linear manner with respect to time during a portion of each deflection cycle.

Cathode ray tubes of the magnetically-deflected type, as now used in television systems, for example, normally require relatively large amounts of power in order to obtain full deflection of the scanning beam. This is true in spite of the fact that an ideal cathode ray beam deflection system consumes virtually no power, and even a practical deflection circuit should theoretically dissipate only a small fraction of the energy circulated in the system. Due to the necessity of obtaining deflection linearity, however, it has been customary to introduce resistance into the deflection circuit in order to dissipate the energy that is stored therein during the retrace, or snapback, portion of each deflection cycle. In a copending United States patent application, Serial No. 593,161, filed May 11, 1945, I have disclosed means whereby the energy thus normally dissipated in the circuit may be reclaimed and utilized either to increase the output of the original power source, or else to reduce the required value of such source while maintaining the same deflection amplitude. By the use of such a system, the power efficiency of cathode ray beam deflection circuits may be raised to a considerable degree.

It is known in the art to supply a cyclically varying current to a pair of cathode ray beam deflection coils, and then to utilize a diode damper tube (which is effectively connected across the deflection coils) to suppress the high-frequency oscillations which would normally occur in the circuit following the retrace, or snap-back, portion of each deflection cycle. This is due to the formation of a tuned circuit by the distributed capacity of the system together with the inductance of the deflection coils. A diode damper tube employed in this manner is shown, for example, in United States Reissue Patent No. 21,400, issued March 19, 1940 to A. D. Blumlein. For some purposes, however, the deflection of the cathode ray beam normally obtainable in a circuit such as set forth in the Blumlein patent does not possess a sufficiently high degree of linearity. This results from the fact that the flow of current through the diode damper tube is not susceptible to being controlled.

It is, however, possible to adapt a circuit such as the above to the production of a more linear flow of current through the deflection coils by the expedient of employing a triode, or other grid-controlled tube, as a damper. By applying a voltage or particular waveform to the control grid of this triode damper tube, the internal resistance thereof may be selectively varied during the scanning portion of each deflection cycle in such a manner that the flow of current through this tube will combine with the flow of current through the power tube to result in a summation current flow through the deflection coils which varies in a linear manner with respect to time. While this type of circuit provides a relatively high degree of current linearity, nevertheless, for certain reasons, including that of economy, it is frequently undesirable to utilize a grid-controlled tube as a substitute for the diode damper.

In a copending United States patent application of S. I. Tourshou, Serial No. 653,261, filed March 9, 1946, issued April 27, 1948, as Patent No. 2,440,418, there is disclosed a cathode ray beam deflection system of the diode damper type, which further includes means for varying the voltage on one of the electrodes of the diode in such a manner that the normal flow of current through the diode is modified. In one embodiment, the system of this mentioned Tourshou application includes a time-delay circuit for deriving a phase-delayed control voltage variation from the output of the power tube.

In accordance with one feature of the present invention, a cathode ray beam deflection circuit utilizing a diode damper tube is so arranged that the flow of current in the damper tube circuit may have a waveform suitable for combination with the waveform of power tube current to result in a linear summation characteristic. This result is achieved by causing the current in the damper tube circuit to decrease, while the voltage on the deflection coils and damper tube circuit is rising. In one embodiment of the invention, such a mode of operation is brought about by utilizing a transformer one winding of which is in series with the diode damper tube. A voltage is then developed across this winding which is essentially in phase opposition to the voltage on the plate of the diode. The transformer thus, in effect, acts as an auxiliary voltage generator in series with the diode. By varying the waveform of the voltage developed by the transformer, the current flow through the diode may be selectively controlled so as to produce a linear deflection coil current.

One object of the present invention, therefore, is to provide an improved type of electromagnetic cathode ray beam deflection circuit suitable for use in television systems, or wherever a substantially linear deflection of a cathode ray scanning beam is required.

Another object of the present invention is to provide an electromagnetic cathode ray beam deflection circuit utilizing a diode damper tube, and to further provide means whereby a control voltage may be inserted in series with the diode damper tube, the waveform of this control voltage being so selected as to produce a desired waveform of current flow through the damper tube.

A further object of the present invention is to provide means whereby a diode damper tube may be employed in connection with an electromagnetic cathode ray beam deflection circuit, and to further provide means whereby a control voltage may be inserted in series with the diode through a transformer which is energized as a function of the operation of the power tube.

Other objects and advantages will be apparent from the following description of preferred forms of the invention and from the drawings, in which:

Fig. 1 is a schematic representation of a known fundamental cyclic power control system for deflecting an electron beam;

Fig. 2 is a graph illustrating possible phase relationships of voltage and current in the system of Fig. 1;

Fig. 3 is a schematic representation of a power control system employing a negative resistance generator to compensate for the I. R. drop in the circuit of Fig. 1;

Fig. 4 is a graphical representation of the negative resistance generated in the circuit of Fig. 3;

Figure 5:
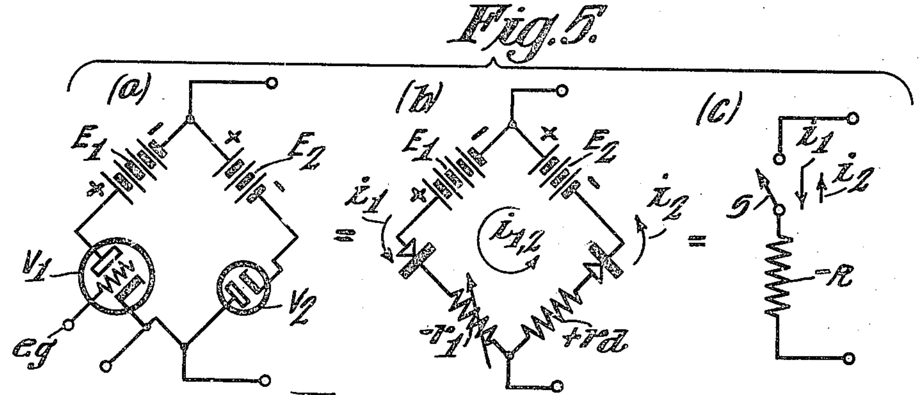
Fig. 5 shows several bridge circuits, and their negative resistance equivalent for obtaining bidirectional currents.

Referring now to the drawings, and particularly to Figure 1, thereof, there is shown a known basic cathode ray beam deflection circuit which is useful in explaining the principle of operation of the present invention. This circuit of Fig. 1 includes an inductance L connected in series with a switch S and a battery E. Inductance L has resistance R and distributed capacity C, and may, for example, comprise a pair of cathode ray beam deflection coils. Upon closing of switch S, battery E produces an exponentially rising current $i_1$ in the inductance L. A percentage of the delivered power is stored as magnetic energy in the field of the inductance. When switch S is opened, this magnetic field reverses, inasmuch as a tuned or resonant circuit is formed by the inductance L and its distributed capacitance C. The magnetic energy in the inductance L is now converted into potential energy in the electrical field of the capacitance by the current flow $+i$ from L to C, and back again into magnetic energy by the reversed current flow $-i$, in substantially one-half cycle of oscillation of the circuit. After reversal of current flow during the snap-back, or retrace period, $T_r$ of the cathode ray scanning beam, the magnetic energy in the inductance L is released for power feedback into the battery E by the closing of switch S. The current $i$ in the subsequent deflection or scanning period $T_s$ may be considered as the sum of the two exponential current $i_1$ and $i_2$. This is graphically illustrated in Fig. 2. It should be noted that a high ratio of L/RT is required for optimum operation—that is, incomplete decay of the transient currents. However, linearity in the circuit of Fig. 1 is not sufficiently high to be practical for use in most television systems. This is due to the fact that linearity of deflection current is not obtainable in such circuits unless the circuit resistance is eliminated during the aperiodic phase of operation. Such an elimination of resistance requires that switch S have a negative resistance, and this can normally be accomplished only if the switch S consists of an electron discharge tube circuit having the characteristics set forth below.

Since a linear reflection of the cathode ray beam requires a current with a constant rate of change with respect to time, it follows that the inductive voltage will equal $$L\frac{di}{dt}$$

This product will be a constant. In Figure 1, however, such a condition is not true, since the induced voltage equals $E-iR$. To obtain linear deflection in such circuits, therefore, the expression $iR$ must be cancelled.

Although the coil resistance R cannot be made zero, a voltage generator modulated in synchronism with the cyclically varying current $i$ can be employed to supply compensation for the $iR$ drop in the aperiodic phase of circuit operation. This is brought about, for example, in the circuit of Fig. 3. Such compensation requires that the characteristic of the generator obey the law $$\frac{\Delta e}{\Delta i} = -R$$

This condition can be met by utilizing the control characteristic of an electron tube.

The function of such an electron tube in generating a negative resistance —R is explained by the graphic construction of Fig. 4. This figure shows that the operating path —R which is constructed from the current and voltage waves is equivalent to the load line in the tube characteristic. The negative control signal voltage $e_g$ is obtained by plotting the intersections of the grid voltage curves with —R against $\Delta t_s$.

The bi-directional current $\pm i$ in the circuit of Fig. 1 requires an operating path —R passing through the zero current value. A single electron discharge tube with one current-carrying electrode can function only when the negative return current $-i$ is eliminated. The tuned circuit must then be made aperiodic by using a shunt resistance to dissipate substantially all the stored energy.

While the above solution is satisfactory for field deflection circuits of low frequency where a short retrace time is obtainable with deflection coils having a large number of turns, it is not satisfactory for the higher frequency line deflection circuits where dissipation of the stored energy in a damping resistor greatly increases the required input power and lengthens the retrace time. For such horizontal deflection circuits, it is therefore desirable to redesign the arrangement of Fig. 1 for the conduction of bi-directional currents. This may be brought about by employing two electron discharge tubes connected to form a bridge circuit. Such an arrangement permits the steady-current component required by tube operation in the positive current region to be balanced out. In order to accomplish this, however, one of the tubes forming the bridge circuit must have a controllable voltage drop.

Figure 6:
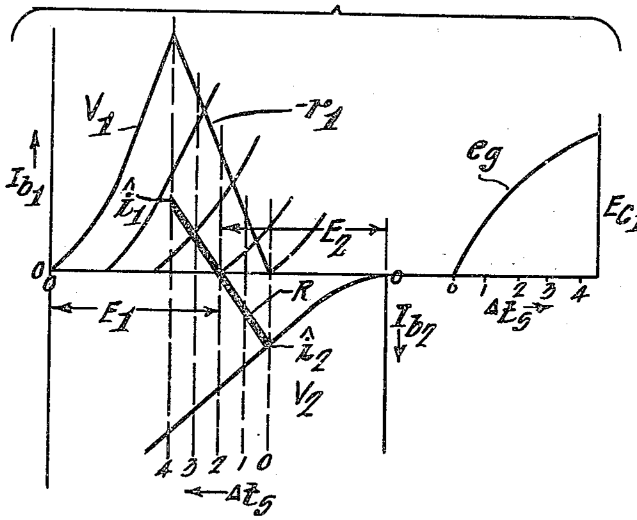
Fig. 6 shows several characteristic curves illustrating the operating conditions necessary for obtaining a balance of the steady current component in the bridge circuits of Fig. 5.

In Fig. 5 (*a*) is shown a bridge circuit comprising one triode $V_1$ and one diode $V_2$. Equivalent switch circuits are shown in (*b*) and (*c*). Tube operating conditions for balance of the steady-current component mentioned above are obtained from the joined tube characteristics as shown in Fig. 6. The load line slope —R is equal to the known positive resistance R of the deflecting coils, ending at $\hat{\imath}_1$ and $\hat{\imath}_2$. In the respective quadrants of $V_1$ and $V_2$, the diode characteristic is drawn so that $\hat{\imath}_2$ lies on the diode line. This determines the plate battery voltage $E_2$. The negative resistance $-r_1$ which must be generated by $V_1$ is constructed by the addition of the diode current and the current required by —R at respective plate voltages (parallel to the current axis). The characteristic of $V_1$ is now shifted until $\hat{\imath}_1$ lies at or below the zero grid voltage line of $V_1$, thus determining the voltage $E_1$. The control grid voltage $e_g$ is readily obtainable from the intersections of $-r_1$ with the grid voltage curves $E_{c_1}$ of $V_1$. With the addition of a transformer, the circuit of Fig. 5 (*a*) may be made to produce a linear current output by adding a variable resistance in series with the diode $V_2$ and also by a proper choice of transformer ratio and waveform xx of the control voltage $e_g$ applied to $V_1$. Although linearity is obtainable, nonetheless the circuit of Fig. 5 (*a*) has relative low efficiency because of the large circulating bridge current.

Figure 7:
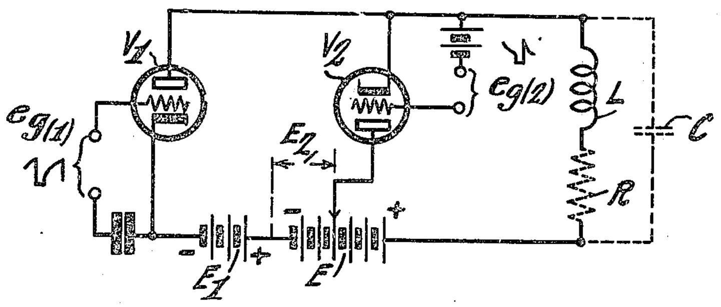
Fig. 7 shows one form of circuit for obtaining linear deflection of a cathode ray beam by using two grid-controlled electron tubes.

The performance of the circuit of Fig. 5 (*a*) may be improved by utilizing bridge circuits having two controlled electron tubes, as shown in Fig. 7. Examples of such circuits are also shown in United States Patent No. 2,280,733, granted April 21, 1942, to W. A. Tolson, and in United States Patent No. 2,382,822, issued August 14, 1945, to Otto H. Schade. In such bridge circuits, each tube contributes to the negative-resistance —R, and circulating bridge currents can be reduced to small values. Since a description of circuits using grid-controlled damper tubes is fully set forth in each of the last-mentioned Tolson and Schade patents, a detailed discussion of Fig. 7 will not be given in the present application. In this connection, however, it should be noted that the combined characteristic of the two grid-controlled tubes forming such a bridge circuit is similar in many respects to that of a standard push-pull amplifier, insofar as the graphic addition of currents is concerned. However, the voltages and currents in the circuits under present consideration are both non-sinusoidal and asymmetric, and the current change $$\frac{di}{dt}$$

along the load line —R should be constant. Moreover, good efficiency and uncritical matching indicate grid voltage amplitudes which can cause cut-off of one tube while the other tube carries peak current.

Figure 8:
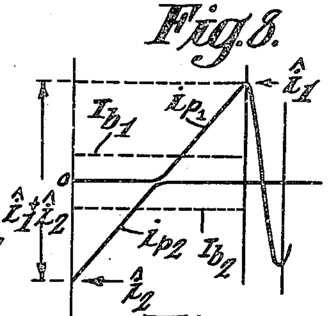
Figs. 8 and 9 are graphs illustrating several matchings of the currents of the two grid-controlled electron tubes in the circuit of Fig. 7 under different conditions of grid voltage.

The waveform and amplitude of the grid voltage $e_{g_2}$ in Fig. 7 determine the magnitude of the "matching" current in the bridge circuit. In Fig. 8 is shown a theoretical mode of operation for zero matching current and for an ideal circuit in which $R=0$. For such an ideal condition, $\hat{\imath}_1=\hat{\imath}_2$. Furthermore, the power loss in the tuned circuit LRC is zero, and hence there is a minimum current drain from the supply voltage source.

Figure 9:
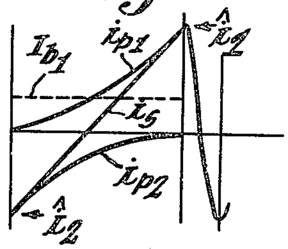

Fig. 9 illustrates one stable operating condition obtainable with practical waveforms for $e_{g_1}$ and $e_{g_2}$.

Figure 10:
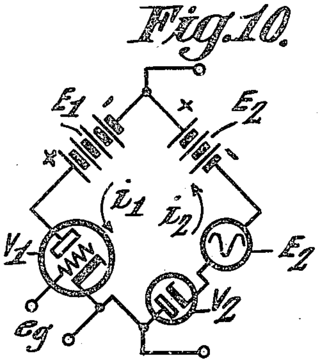
Fig. 10 illustrates one form of diode control circuit in accordance with the present invention, in which the diode is connected in series with an auxiliary voltage generator.
Figure 11:
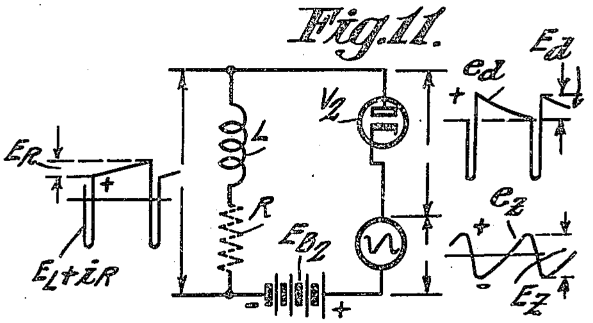
Fig. 11 illustrates a switch circuit equivalent to the diode control circuit of Fig. 10.

It has been shown above that a negative resistance characteristic —R equal to the total circuit resistance is readily obtainable by using a grid-controlled tube, the current through which may be caused to fall while the tube plate voltage is rising. However, when such a grid controlled tube is replaced by a diode, it is necessary that certain modifications in the previously described arrangement be made so that the diode will, in effect, function as an artificial triode. One way of accomplishing this is to insert a supplementary control voltage source in series with a diode, this auxiliary voltage source acting in effect as a generator to produce a voltage $E_z$. A circuit illustrating this principle is shown in Fig. 10. Efficient operation of this artificial triode circuit requires a diode current cut-off by a decreasing diode plate voltage, while linearity of deflection current requires a diode current cut-off in the face of an increasing deflection coil voltage $E_L+i_R$. It is therefore necessary that $e_z$, which constitutes the output of the auxiliary generator should approximate a sawtooth waveform. Fig. 11 shows possible waveforms for the voltage appearing across the deflection coil L, and also for the voltage across both the diode $V_2$ and the auxiliary generator generating the voltage $e_z$.

Figure 12:
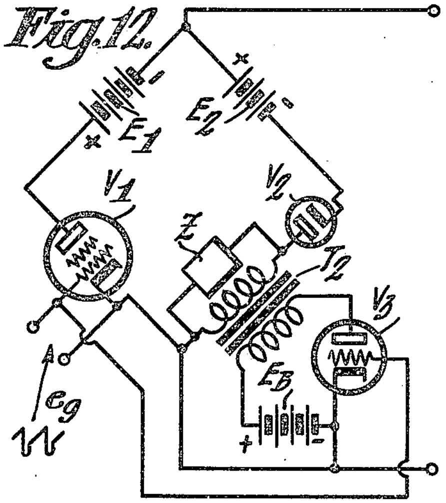
Fig. 12 is a modification of Fig. 10 in which the auxiliary voltage generator is in the form of a transformer.

Insertion of the voltage $e_z$ into the diode circuit of Fig. 5 (*a*), for example, may be effected by means of a transformer $T_2$, one winding of which is connected in series with either the plate or cathode of the diode $V_2$. An arrangement of this nature is shown in Fig. 12. The other winding of transformer $T_2$ may be energized by current supplied from a third electron discharge tube $V_3$, controlled by the voltage $e_{g_1}$ applied to the control electrode of the tube $V_1$.

The voltage $e_z$ is developed across an impedance Z representing the internal impedance of the auxiliary generator. This impedance Z may be connected across either or both of the primary or secondary windings of transformer $T_2$. In order to obtain a suitable waveform for the voltage $e_z$, it is usually desirable that the transformer $T_2$ reverse the phase of the voltage applied to its primary winding. It is also preferable that the impedance Z be dominantly reactive, although this is somewhat difficult because of the required sawtooth voltage shape. One type of impedance which may, therefore, be used is a pure resistance, which acts as an impedance to a number of the harmonic components of the sawtooth wave.

The characteristics of the impedance Z, however, determine the limits within which the amplitude, waveform and phase of the voltage $E_z$ may be varied for practical operating conditions of the circuit to produce a linear deflection current. A graphic solution for the control voltage $e_z$ is therefore shown in Figure 13. The ideal but critical class "B" operating condition shown in Fig. 8 requires that the individual load path of the tube $V_2$ follow the load line −R to the cut-off point at $i=0$, where the load path turns sharply to the left and remains at $i=0$ for the second half of the load cycle. The current of $V_1$ is zero in the first half of the load cycle, its load path then turning sharply to follow the load line −R to $i_1$.

The diode characteristic (Fig. 13) is drawn through the initial current $i_2$. The cut-off point places the value of the series control voltage at $T_s=0$. The voltage $E_R$ on the deflection coil resistance (load line) changes linearly and is divided into equal increments $\Delta E_R$ which correspond to equal time increments $\Delta t_s$ on the control voltage time base. The instantaneous value of $e_T$ at a time $\Delta t_s=1$, for instance, is found as the voltage by which the diode line must be shifted to the left to intersect —R at the corresponding plate voltage change $\Delta E_R=1$. In this manner the control voltage wave $a$ is obtained, following the "load line limit" to point O, ($\Delta T_s=1.8$). The cut-off point then moves along the broken line to point C. The wave shape of $e_Z$ in the range $\Delta t_s=1.8$ to $\Delta t_s=4$ (points O to C) may vary as long as it remains to the left of the broken line connecting points O and C. It may thus have the form indicated by curve $a$, which in the example given represents the closest approach to a sine wave shape giving efficient linear deflection.

It may also be shown from the above that under practical operating conditions the control voltage wave must remain both below and to the right of the shaded area in Fig. 13 (marked by the load line limit) up to the cross-over point O, and that once having crossed the cut-off line (the broken line between points O and C) it should remain to the left of this broken line for the remaining portion of the scanning interval $T_s$. Other waveforms in Fig. 13 fulfilling this arrangement are shown as $b$ and $c$. However, the dotted sine wave $s$ crosses the broken line, or cut-off, limit again at $t_s=2.7$, and causes a premature return of the diode current, thus requiring a marked rise in power tube plate current if deflection linearity is to be maintained.

Figure 13:
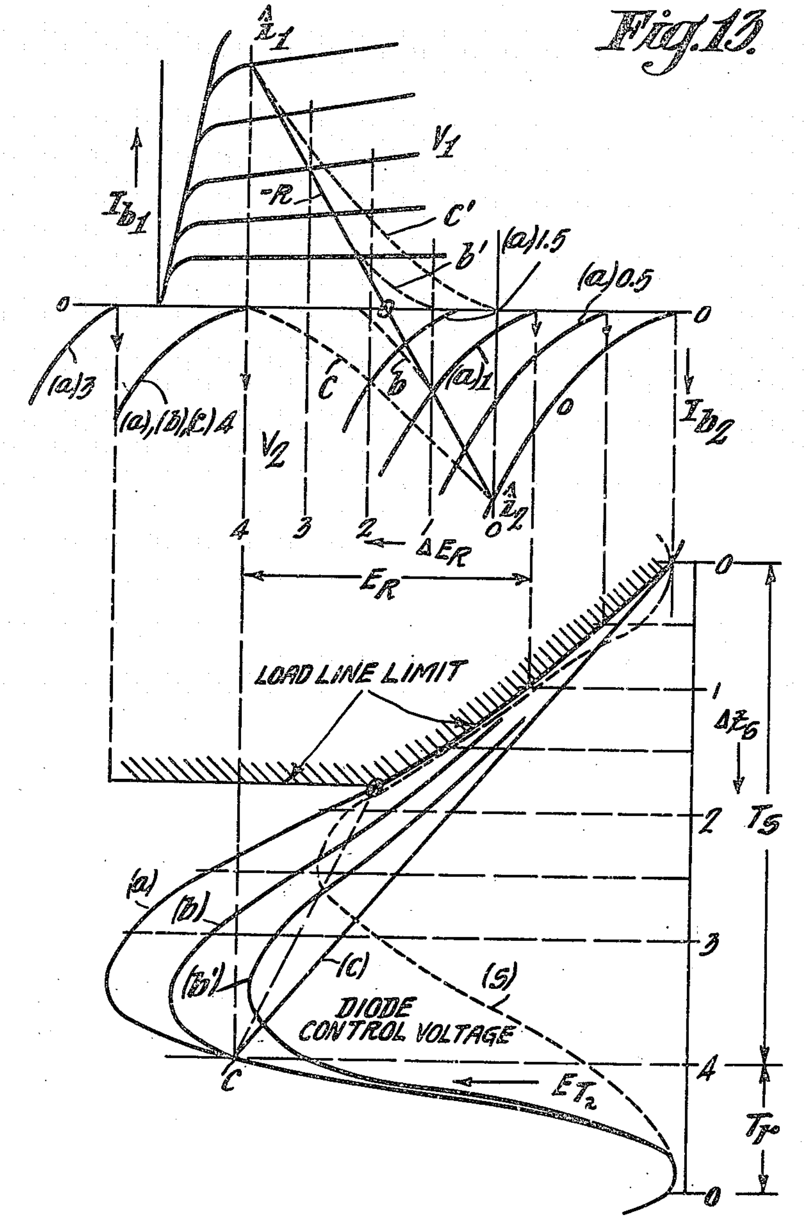
Fig. 13 is a graph illustrating the characteristics of the control voltage required for linear deflection of a cathode ray scanning beam when using a controlled diode circuit such as shown in Figs. 10 and 12.

Curve $b'$ in Fig. 13 shows that an amplitude reduction of curve $b$ results in a second cross-over of the broken line $o$—$c$. This indicates that the magnitude of the impedance Z, as well as the phase of the voltage $e_z$, must be carefully adjusted. Voltages approaching the sawtooth shape wave $c$ are less critical, however, and are more readily controlled when the impedance Z approaches a pure resistance.

Figure 14:
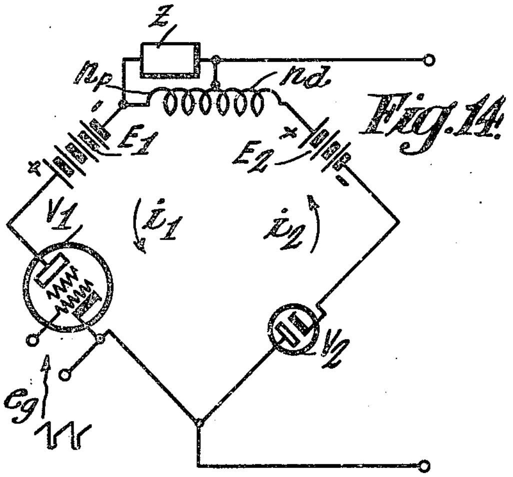
Fig. 14 is a modification of the controlled diode circuit of Fig. 12.

Fig. 14 illustrates a modification of the circuit of Fig. 12 in which $T_2$ is re-arranged as an auto-transformer. In the circuit of Fig. 14, the auxiliary control voltage is supplied by the power tube $V_1$ instead of from an additional tube $V_3$. Furthermore, in the circuit of Fig. 14, the transformer $V_2$ is arranged to have a small step-down ratio, since the current $i_1$ must supply shunt losses and also exceed the diode current $i_2$ in the secondary current relationship:

$$i_s=\left(\frac{n_p}{n_d}\right)i_1+i_2$$

Figure 15:
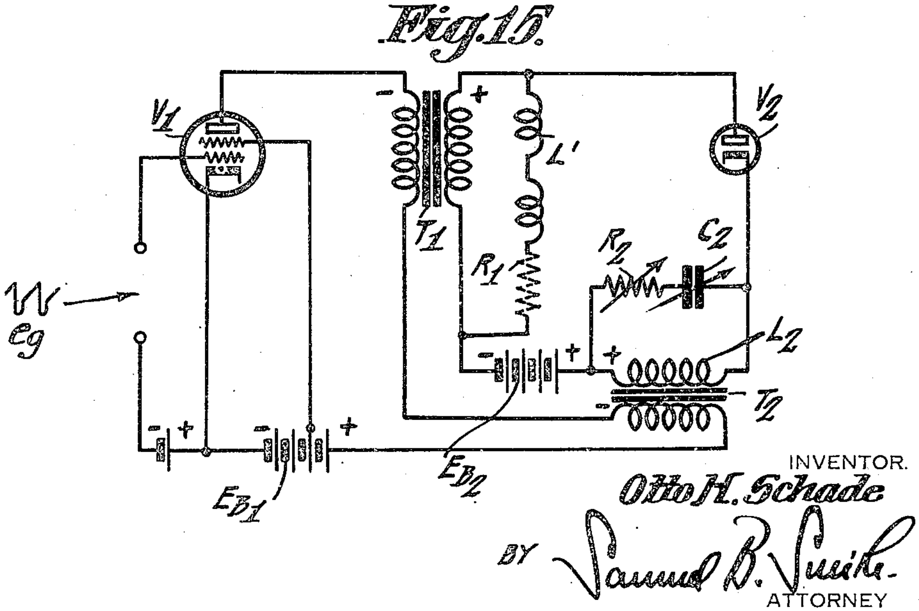
Fig. 15 is a rearrangement of Fig. 14 in which the efficiency of the latter circuit is increased.

In Fig. 15 is shown a practical form of cathode ray beam deflection circuit, the cathode ray beam deflection coils, as heretofore, being represented by the inductance L'. This circuit also permits an adjustment of voltage phase relationships and voltage waveshapes through the use of an adjustable resistor $R_2$ in series with a condenser $C_2$, these elements being connected in parallel with the secondary winding $L_2$ of transformer $T_2$. Thus the elements $R_2$, $C_2$ and $L_2$ effectively comprise an impedance Z. By varying the value of capacitor $C_2$ (or the inductance of winding $L_2$, if preferred) a phase adjustment for $E_z$ is provided. Control over the waveshape and amplitude of voltage $E_z$ is provided by resistor $R_2$, since the elements $L_2$, $C_2$ and $R_2$ form a damped resonant circuit. This permits the constants $L_2$ and $C_2$, as well as the step-down ratio of the transformer $T_2$, to be properly selected. Higher impedance L. C. circuits and greater step-down ratios permit the use of larger values for resistor $R_2$, resulting in a closer approach to a sawtooth control voltage $E_z$ and more flexibility than is obtainable with low-impedance circuits and a smaller step-down ratio, since in the latter case a higher value of "Q" is necessary to build up sufficient control voltage which is also more sinusoidal in shape.

Figures 16, 17, 18:
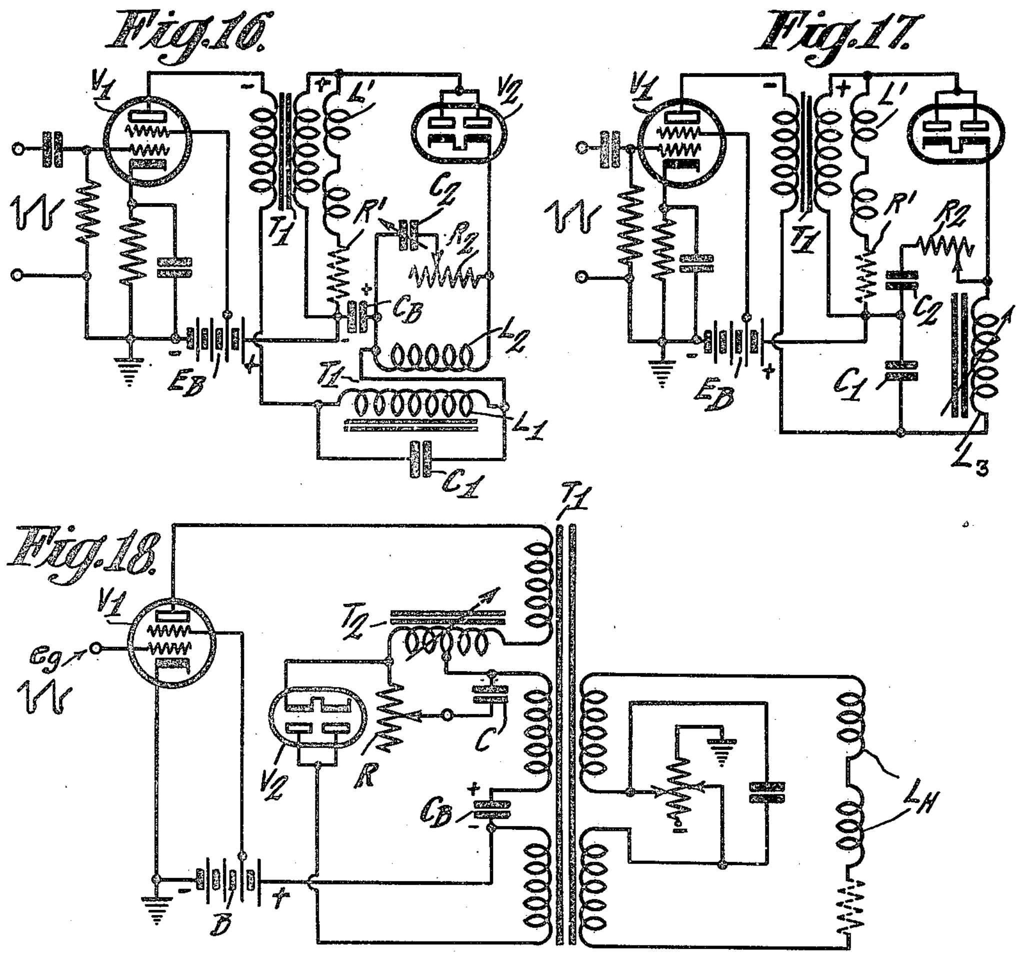
Fig. 16 is a controlled diode circuit along the lines of Fig. 15 and which in addition employs power feedback, or voltage "boost"
Fig. 17 is a modification of Fig. 16 in which the voltage-generating transformer of Fig. 16 is replaced by a choke.
Fig. 18 is a modification of Fig. 16 which, in addition, provides for centering of the cathode ray beam.

The circuit of Fig. 15 requires that the supply voltage $E_{B_1}$ be increased to compensate for the voltage drop across impedance Z. However, this voltage drop, together with the power normally lost in the secondary circuit, may be in a large measure regained by the expedient of feeding back this power to the source $E_{B_1}$ to thereby provide increased operating voltage for the power tube $V_1$. This principle is fully disclosed in the copending Schade application Serial No. 593,161 referred to above, and hence the details of such a power-feedback system will not be set forth in the present application. However, one circuit employing the power feedback principle, in connection with a diode damper tube in series with an auxiliary generator as previously disclosed, is shown in Figure 16. This circuit is similar in many respects to the circuit of Figure 15. However, it will be noted that in Figure 16 the anode of the power tube $V_1$ receives its operating potential from the source $E_{B_1}$ through the capacitor $C_B$, these elements being connected so that the voltages on both the battery $E_{B_1}$ and capacitor $C_B$ are in series-aiding relation. In connection with the circuit of Figure 16, however, it should be noted that the effective "boost" voltage obtainable is somewhat reduced by the voltage drop across the impedance Z ($C_2$, $R_2$ and $L_2$) which varies according to the value selected for $R_2$.

Figure 17 is a modification of Figure 16 in which the transformer $T_2$ is replaced by a variable inductor $L_3$, and in which the "boost" is developed on capacitor $C_2$ rather than on the capacitor $C_B$ of Figure 16. This permits the elimination of capacitor $C_B$ and also permits, in many cases, the use of less expensive circuit components. However, the circuit of Figure 17, while combining the capacitors $C_B$ and $C_2$, is restricted to circuits having higher "Q" values and more critical operating conditions than is the case with the circuit of Figure 16. The ratio of $C_2$:$C_1$ determines the stepdown ratio in the same manner that the ratio of $L_1$ to $L_2$ determines this ratio in Figure 16.

Figure 19:
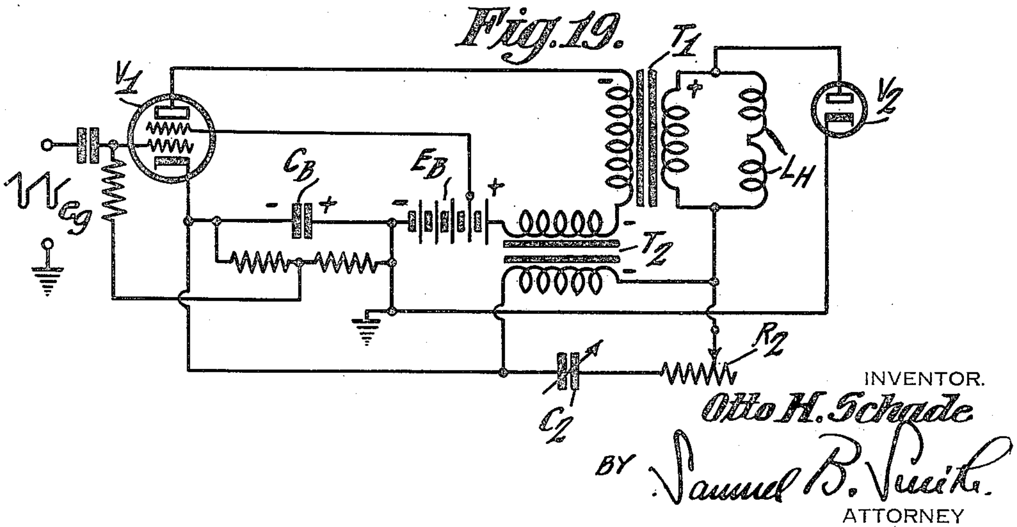
Fig. 19 is a modification of Fig. 16 in which the power feedback is applied to the cathode circuit of the power tube.

Figures 18 and 19 show additional power feedback arrangements utilizing the principles above set forth. In Figure 18 is a practical cathode ray beam deflection circuit in which the transformer $T_1$ has its primary and secondary windings preferably wound bifilar (two wires at one time) so as to obtain a higher coupling coefficient. Transformer $T_2$ is preferably of the permeability-tuned type, and also has bifilar wound windings to provide tighter coupling there between.

Figure 19 illustrates a cathode ray beam deflection circuit in accordance with the present invention in which the power feedback condenser $C_B$ is connected in the cathode circuit of the power tube $V_1$. The voltage developed on this "boost" condenser $C_B$ during operation of the circuit is of such polarity that the negative plate thereof may be connected to the cathode of power tube $V_1$, thus providing for an increased negative voltage on the cathode of the power tube in the same manner that the circuits of Figures 16, 17 and 18 provide for an increased positive voltage on the power tube anode. In Figure 19, furthermore, the "boost" condenser $C_B$ is so connected as to provide a cathode bias voltage for the power tube $V_1$.

I claim:

1. In a television system in which a power output tube is adapted to deliver cyclically varying current through a coupling transformer to the electro-magnetic beam deflection means associated with a cathode ray tube wherein an electron beam is developed and then deflected by the passage of said current through said deflection means so as to scan a target area, and in which means, including a two-element electron discharge device, are provided in shunt with at least a portion of said coupling transformer for damping out oscillations which would normally be produced during a portion of each current cycle in part by the inductance of said transformer and said deflection means, the combination of an impedance connected in series with said electron discharge device, and a circuit coupled to said impedance for developing across said impedance, independently of the conductive status of said electron discharge device, a control voltage variation bearing a selectively predetermined phase relationship to the varying voltage appearing across said electro-magnetic beam deflection means, whereby the cyclic flow of current through said electron discharge device is modified from that which would normally flow therethrough as a result of the voltage applied to said electron discharge device from across said electro-magnetic beam deflection means.

2. A television system according to claim 1, in which said impedance includes an auxiliary transformer having its secondary winding connected in series with said electron discharge device.

3. A television system according to claim 2, in which said circuit for developing a control voltage variation across said impedance includes means for causing a cyclically varying current to flow through the primary winding of said auxiliary transformer.

4. In a television system in which a power output tube is adapted to deliver cyclically varying current through a coupling transformer to the electro-magnetic beam deflection means associated with a cathode ray tube wherein an electron beam is developed and then deflected by the passage of said current through said deflection means so as to scan a target area, and in which means, including a two-element electron discharge device, are provided in shunt with at least a portion of said coupling transformer for damping out oscillations which would normally be produced during a portion of each current cycle in part by the inductance of said transformer and said deflection means, the combination of an impedance including an auxiliary transformer having its secondary winding connected in series with said electron discharge device, and a circuit including means for causing the cyclically varying current output of said power output tube to flow through the primary winding of said transformer for developing across said impedance, independently of the conductive status of said electron discharge device, a control voltage variation bearing a selectively predetermined phase relationship to the varying voltage appearing across said electro-magnetic beam deflection means, whereby the cyclic flow of current through said electron discharge device is modified from that which would normally flow therethrough as a result of the voltage applied to said electron discharge device from across said electro-magnetic beam deflection means.

5. In a television system in which a power output tube is adapted to deliver cyclically varying current through a coupling transformer to the electro-magnetic beam deflection means associated with a cathode ray tube wherein an electron beam is developed and then deflected by the passage of said current through said deflection means so as to scan a target area, and in which means, including a two-element electron discharge device, are provided in shunt with at least a portion of said coupling transformer for damping out oscillations which would normally be produced during a portion of each current cycle in part by the inductance of said transformer and said deflection means, the combination of an auxiliary transformer having its secondary winding connected in series with said electron discharge device, a resistor, a capacitor, means for connecting said resistor and said capacitor in series across the said secondary winding of said auxiliary transformer, and a circuit for developing across the secondary winding of said auxiliary transformer, independently of the conductive status of said electron discharge device, a control voltage variation bearing a selectively predetermined phase relationship to the varying voltage appearing across said electro-magnetic beam deflection means.

6. A television system according to claim 5, further including means for adjusting the value of said resistor to thereby provide a control over the amplitude of the voltage variation developed by said circuit.

7. A television system according to claim 5, further including means for varying the value of said capacitor thereby to provide a control over the phase of the voltage variation developed by said circuit relative to the phase of the varying voltage appearing across said electro-magnetic beam deflection means.

8. In a television system, at least one cathode ray beam deflection coil, a power output tube having a plate circuit coupled to said coil for supplying deflecting current thereto, a diode and an impedance connected effectively in series across said deflection coil, and a control circuit energized by the current output of said power tube for developing across said impedance a voltage bearing a predetermined phase relationship to said deflecting current.

9. A television system according to claim 8, in which said impedance includes a transformer having its secondary winding in series with said diode and its primary winding connected in said control circuit.

10. In a television system, at least one cathode ray beam deflection coil, a power output tube having a plate circuit coupled to said coil for supplying deflecting current thereto, and a diode and an auxiliary voltage generator connected effectively in series across said deflection coil, said auxiliary voltage generator being adapted to generate a voltage bearing a predetermined phase relationship to the current output of said output tube as supplied to said deflection coil.

11. A television system according to claim 10, in which the operation of said auxiliary voltage generator is controlled as a function of the operation of said power output tube.

12. In a television system, a power output tube having at least an anode, a cathode and a control electrode, a pair of deflection coils connected to be energized by current flowing in the anode-cathode circuit of said power tube, a transformer having primary and secondary windings, a diode damping tube connected in series with the secondary winding of said transformer across said pair of deflection coils, means for applying a periodically varying voltage to the control electrode of said power tube to cause a cyclically varying current flow through said deflection coils, and means for causing the current flowing in the anode-cathode circuit of said power tube to also flow through the primary winding of said transformer, thereby effectively decreasing the voltage drop across said diode damping tube in accordance with an increase in the current output of said power tube.

13. In a television system employing a cathode ray tube wherein an electron beam is developed and then deflected to scan a target area, and in which the means for deflecting said electron beam includes a generator producing a cyclically varying current output, at least one deflection coil associated with said cathode ray tube, means for coupling said generator to said deflection coil, and a damper tube circuit, including a diode, for damping out undesired voltage oscillations normally developed across said deflection coil, the improvement which comprises an auxiliary voltage generator connected in said damper tube circuit in series with said diode, said auxiliary voltage generator acting to produce a voltage on one electrode of said diode such that the voltage across said diode will decrease in the face of a cyclic increase in the current output of said first-mentioned generator.

14. A television system according to claim 13, further comprising an energy-storage device in said damper tube circuit and connected in series both with said diode and with said auxiliary voltage generator, and a circuit for applying the energy stored by said energy-storage device during operation of said system to said first-mentioned generator to increase the normal current output thereof.

15. In combination, a source of D.-C. power, means for converting D.-C. power from said source into A.-C. power, a load circuit into which the A.-C. power output of said converting means is fed, said load circuit including an inductive member having distributed capacity, a diode rectifier across said inductive member, and an energy-storage device connected in series means for applying the energy stored by said energy-storage device to said converting means in series with said D.-C. source, and an auxiliary voltage generator in series with said diode rectifier and said energy-storage device, said auxiliary voltage generator being adapted to produce a cyclically varying voltage output bearing a predetermined phase relationship to the A.-C. power output of said converting means.

16. The combination of claim 15, in which said auxiliary voltage generator includes a variable inductor, a resistor, and at least one capacitor, said resistor and capacitor being connected in series across said variable inductor.

17. In a television system of the type in which a power output tube is adapted to deliver cyclically varying current to a pair of cathode ray beam deflection coils through a coupling transformer, and in which a diode damper tube and an energy-storage device are connected effectively in series across at least a portion of one winding of said coupling transformer, the combination of a circuit for connecting said energy-storage device to said power output tube so as to effectively increase the power output thereof, and an auxiliary voltage generator in series both with said diode damper tube and with said energy-storage device, said auxiliary voltage generator being connected in the output circuit of said power tube and being energized by the flow of power tube current therethrough.

18. The combination of claim 17, in which said auxiliary voltage generator includes an autotransformer the entire winding of which lies in the output circuit of said power tube and a portion of which winding lies in the circuit which includes said diode damper tube and said energy-storage device.

19. The combination of claim 18, further including a condenser and a resistor connected in series across that portion of the winding of said autotransformer which lies in the said damper tube circuit.

OTTO H. SCHADE.

REFERENCES CITED

The following references are of record in the file of this patent:

UNITED STATES PATENTS

| Number | Name | Date |
|---|---|---|
| 2,370,426 | Schade | Feb. 27, 1945 |